United States Patent [19]

Graham et al.

[11] 4,069,490
[45] Jan. 17, 1978

[54] CAMERA CONSTRUCTION

[75] Inventors: Thomas G. Graham, Point Pleasant Beach; John Maltese, Saddle Brook, both of N.J.; Israel Nesson, Brighton, Mass.; Robert Mitchell, Pequannock, N.J.

[73] Assignee: Berkey Photo, Inc., Clifton, N.J.

[21] Appl. No.: 675,815

[22] Filed: Apr. 12, 1976

Related U.S. Application Data

[62] Division of Ser. No. 558,933, March 17, 1975, Pat. No. 3,983,570.

[51] Int. Cl.² .................................................. G03B 17/50
[52] U.S. Cl. ........................................ 354/83; 354/86; 354/173; 354/212
[58] Field of Search .............. 354/85, 86, 83, 304, 354/212, 173, 174

[56] References Cited
U.S. PATENT DOCUMENTS

| | | | |
|---|---|---|---|
| 3,750,551 | 8/1973 | Land et al. | 354/83 |
| 3,753,392 | 8/1973 | Land | 354/86 |
| 3,987,466 | 10/1976 | Murray | 354/86 X |

Primary Examiner—Richard L. Moses
Attorney, Agent, or Firm—Neuman, Williams, Anderson & Olson

[57] ABSTRACT

A camera construction is provided which is adapted to removably accommodate a cartridge of self-developing film. The cartridge presently available on the market includes a rectangularly shaped container having a self-contained battery and a stack of photographic sheets of like configuration disposed therein and arranged so that only the uppermost sheet may be exposed. Subsequent to exposure, the uppermost sheet is slidably removed from the container and discharged from the camera housing through a suitable opening formed therein. The invention in question relates primarily to the mechanism for automatically removing the uppermost sheet from the cartridge container and then to discharge same from the camera housing whereupon the self-developing process for the discharged sheet will occur within a predetermined time.

18 Claims, 24 Drawing Figures

CAMERA CONSTRUCTION

This is a division of application Ser. No. 558,933 now U.S. Pat. No. 3,983,570 filed Mar. 17, 1975.

BACKGROUND OF THE INVENTION

Various cameras for self-developing film have heretofore been available; however, because of certain design characteristics they have been beset with one or more of the following shortcomings; a) once the shutter actuating button has been manually depressed the feed-cycle will automatically begin thereby preventing the operator from controlling when the exposed photographic sheet is to be discharged from the camera housing; b) it cannot be readily ascertained when the camera is loaded, or when the last photographic sheet of the cartridge has been exposed without manually opening a portion of the camera housing; c) the mechanism for ejecting the exposed photographic sheets is highly complex and susceptible to malfunction; d) to ready the camera to take a picture requires the operator to set up components from a collapsed condition which may be an awkward and frustrating manipulation and frequently causing damage to or malfunctioning of the components; e) it is awkward to hold the set up camera without accidentally causing the operator's fingers to partially obstruct the opening in the housing through which the exposed photographic sheet is discharged, or partially obstruct the light rays emitted from the flash bar, or partially obstruct the main lens area; f) the operating procedure for setting up and properly positioning the camera relative to the object being photographed is awkward and time-consuming and requires the operator to have a substantial amount of dexterity; and g) in setting up the camera for use or collapsing same for storage, portions of the housing are susceptible to being manually distorted thereby causing malfunctioning of the camera.

SUMMARY OF THE INVENTION

Thus, it is an object of this invention to provide a camera of the type described which enables the operator to readily control when the exposed photographic sheet is to be discharged from the camera housing and, thus, protect the discharged sheet from being exposed to undesirable environmental conditions.

It is a further object of the invention to provide a camera of the type described which does not require manual withdrawing of the photographic sheet from the camera housing once the sheet has been exposed within the camera housing.

It is a further object of the invention to provide a camera of the type described which automatically indicates the number of unexposed photographic sheets remaining within the camera housing.

It is a further object of the invention to provide a camera of the type described having a mechanism for automatically resetting the shutter means to its cocked position upon manual release of the shutter-actuating means.

It is a still further object of the invention to provide a camera of the type described having means for automatically deactivating a flash means incorporated in the camera when the last of the photographic sheets has been exposed and ejected from the camera housing.

It is a still further object of the invention to provide a camera of the type described which does not require the housing to be manually manipulated to a predetermined set-up condition before the object can be photographed.

It is a still further object to provide a camera of the type described which does not require the talents of one possessed of substantial dexterity in order to properly operate the camera.

Further and additional objects will appear from the description, accompanying drawings and appended claims.

In accordance with one embodiment of the invention, a camera is provided which is adapted to removably accommodate a cartridge of self-developing photographic film sheets arranged in stacked superposed relation within a container. The cartridge also is provided with a power pack which is disposed within the container and is energized only when the cartridge is loaded into the camera so as to cause a shield piece initially carried within the container to be automatically discharged therefrom and out through an opening formed in the camera housing thereby enabling the first photographic sheet of the stack to be ready for exposure when the shutter release means is subsequently manually manipulated. The camera housing is provided with a cartridge-accommodating compartment and an opening therefor through which the cartridge passes when being inserted into or removed from the camera. The opening is normally closed by a hinged door assembly. The shutter release means when manually manipulated from its normal inoperative position to its operative position will cause the uppermost photographic sheet within the cartridge container to be exposed. Disposed within the housing is a cycle mechanism which is adapted to slidably remove the exposed uppermost photographic sheet endwise from the container past a feeder-spreader and guide mechanism carried on the door assembly and then out through the opening formed in the housing only during the shutter release means being returned from its operative position to its inoperative position. The power source disposed within the cartridge container drives the cycle mechanism through a complete cycle as the exposed photographic sheet is being removed from the container and discharged from the camera. The cycle mechanism includes a picker unit which is mounted within the housing and is adapted to move in a substantially reciprocatory motion during actuation of the mechanism. When the picker unit is moving in one relative direction, the uppermost exposed photographic sheet disposed within the container of the accommodated cartridge is engaged thereby and slidably moved laterally or endwise out an elongated narrow opening formed in the end wall of the container to a plurality of feeder and spreader rollers mounted on the door assembly. Actuation of the picker means in the one direction causes a counter unit adjustably mounted within the housing to move a predetermined distance thereby indicating through a housing aperture the number of unexposed photographic sheets still remaining within the container. The mechanism also includes a shutter-rewinding means movably mounted within the housing and adapted to be moved in one direction in timed sequence with the movement of the picker unit. The shutter-rewinding means is operatively connected to the shutter blades forming components of the shutter assembly.

DESCRIPTION

For a more complete understanding of the invention, reference should be made to the drawings wherein:

FIGS. 19 and 20 are enlarged fragmentary vertical sectional views of a photographic sheet guide mechanism carried on the door assembly; FIG. 20, showing a photographic sheet moving through said mechanism.

Figure 1:
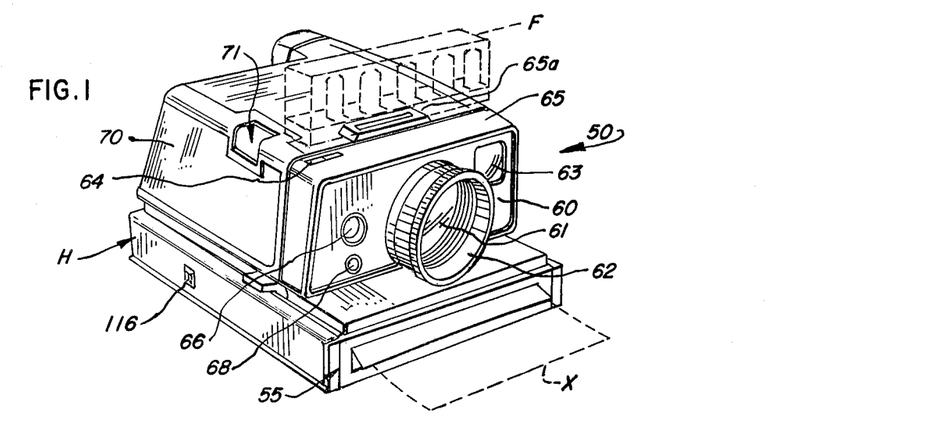
FIG. 1 is a perspective front view of one form of the improved camera showing in phantom lines a flash bar mounted on the exterior of the camera housing and an exposed photographic sheet being discharged from the front of the housing.
Figure 3:
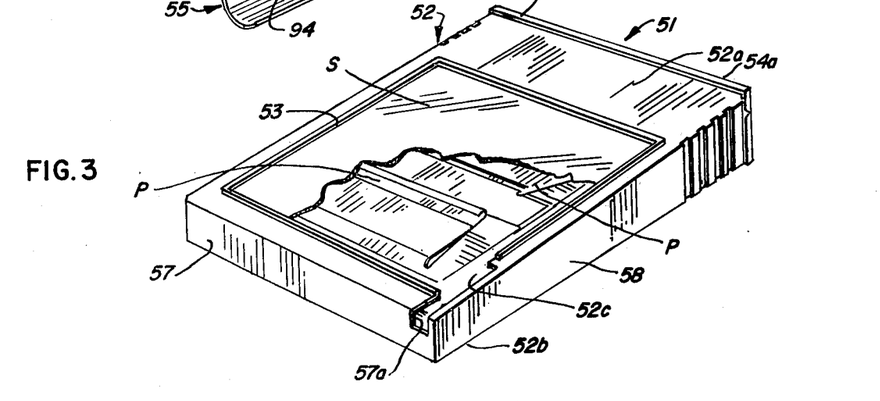
FIG. 3 is an enlarged perspective top view of a film cartridge showing the apertured top surface of the container and with the photographic sheets accommodated therein partially removed so as to expose a portion of the spring means incorporated within the container for exerting an upward bias on the accommodated sheets and retaining same in proper registered relation with the aperture formed in the top surface.
Figure 4:
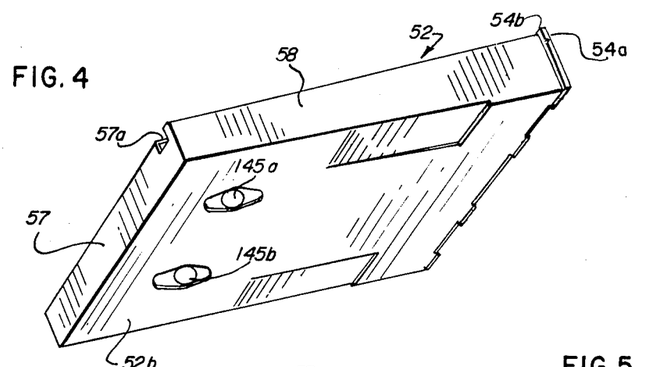
FIG. 4 is an enlarged perspective view of the underside of the cartridge container of FIG. 3 and showing exposed contacts for the power pack disposed within the container.
Figure 5:
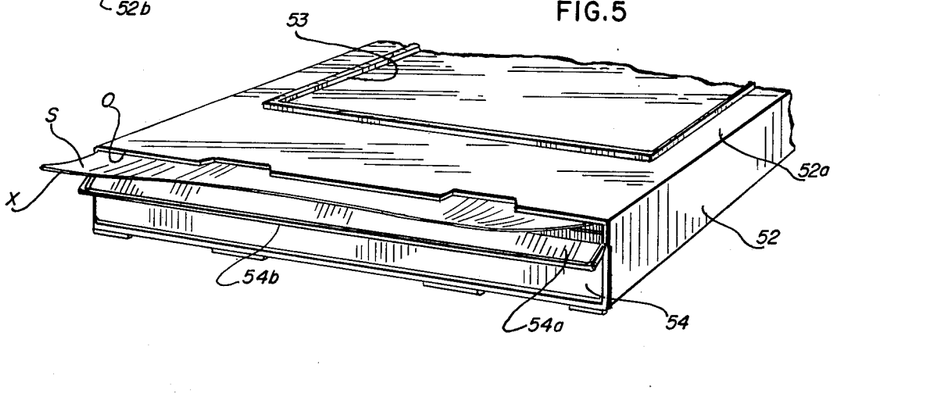
FIG. 5 is an enlarged fragmentary perspective end view of the container of FIG. 3 and showing an exposed photographic sheet partially discharged from the elongated narrow opening formed in the end wall of the container.

Referring now to the drawings and more particularly to FIG. 1, one form of an improved camera 50 is shown which is adapted to accommodate a cartridge of self-developing film 51, see FIGS. 3–5. The film cartridge 51, as illustrated, is presently available on the commercial market and comprises a plurality (i.e., ten in number) of rectangular photographic sheets S of like configuration which are arranged in stacked superposed relation within a suitable container 52 with the corresponding light-sensitive surface of each sheet facing in the same direction towards an apertured top wall 52a of the container. The configuration of the aperture 53 formed in wall 52a is similar to the size and shape of the light-sensitive area of each sheet disposed within the container 52. Initially, the stack of photographic sheets is normally overlaid by an opaque protective shield piece (i.e., cardboard) which prevents accidental exposure of the photographic sheets prior to the cartridge being initially inserted onto the camera housing. The shield piece is automatically removed from the container when a new cartridge is initially inserted to its full extent into the housing compartment C and the entry E to the compartment is manually closed by a door assembly 55, see FIGS. 1 and 10. Once the shield piece has been removed, the light-sensitive surface of the uppermost photographic sheet of the stack is aligned with and adjacent to the aperture 53 in the top wall of the container.

The stack of photographic sheets and the shield piece are resiliently held against the portions of the top wall 52a of the container 52, which delimit the aperture 53, by a spring member P carried on the bottom wall 52b of the container and extending into the interior thereof, see FIG. 3.

Figure 2:
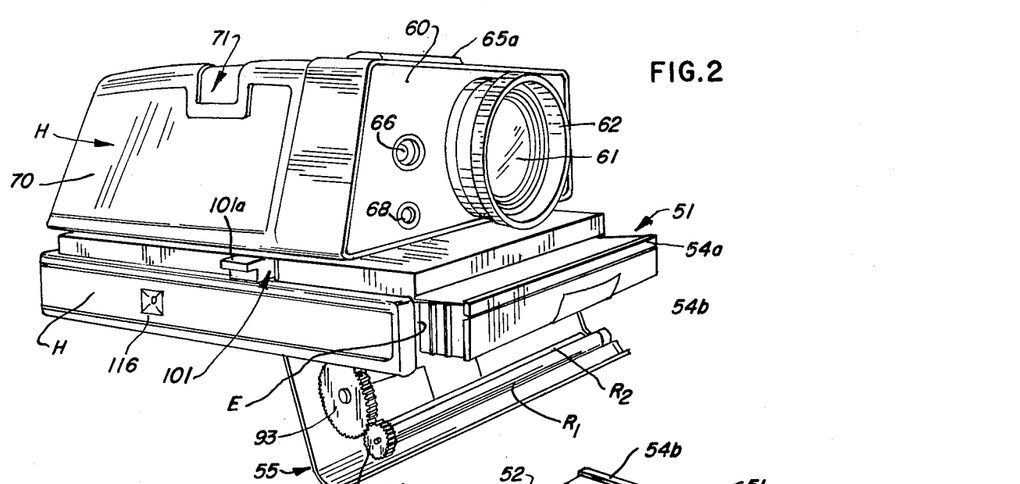
FIG. 2 is a perspective front view of the camera of FIG. 1 but showing the door assembly thereof in an open position and a film cartridge in a partially loaded condition within the camera housing.

As seen in FIG. 5, the upper portion of front end wall 54 of the container 52 is provided with a hinged section 54a which is adapted to automatically assume an open position when the cartridge is fully loaded into the camera housing H through the entry E formed in the lower front side of the housing, see FIG. 2. When hinged section 54a is in its open position, an elongated narrow opening O is formed in the end wall. The shield piece and successive photographic sheets, upon being disposed adjacent the apertured top wall 52a of the container 52, will be successively moved endwise through the opening O in a manner to be hereinafter described. As will be noted in FIGS. 2 and 3, the upper elongated edge 54b of the hinged section 54a initially projects upwardly above the top wall 52a of the container and engages a stationary upper segment of the housing front wall, which delimits the entry E, and is cammed thereby into the open position as seen in FIG. 5.

Figure 10:
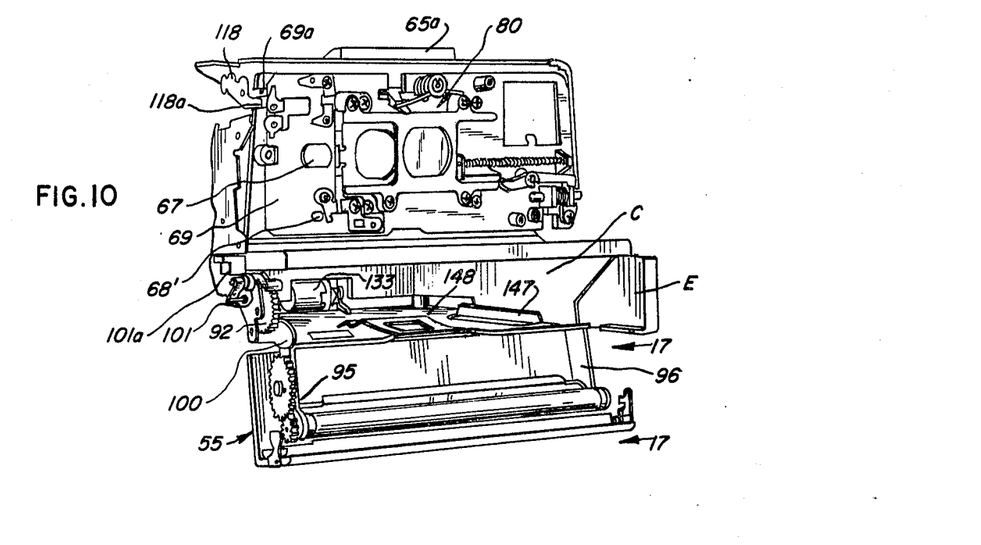
FIG. 10 is a fragmentary perspective front view of the camera as shown in FIG. 7 and with the front of the housing removed so as to expose various components comprising the shutter mechanism.
Figure 18:
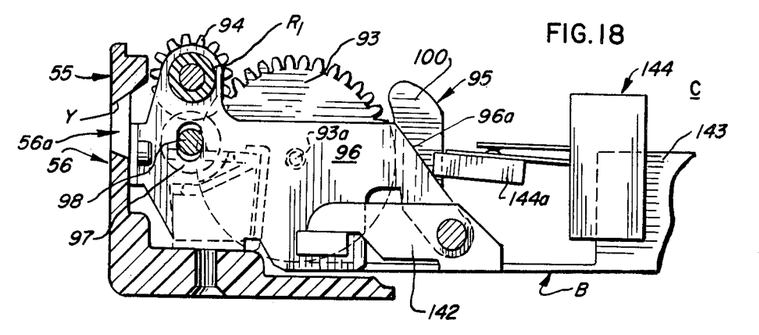
FIG. 18 is similar to FIG. 17 but showing the door assembly in a closed position.

Once the cartridge is fully inserted within the compartment C formed within the housing H, see FIG. 10, the entry E is closed by the door assembly 55 upon the latter being manually moved to its closed position as seen in FIGS. 1 and 18.

Figure 19:
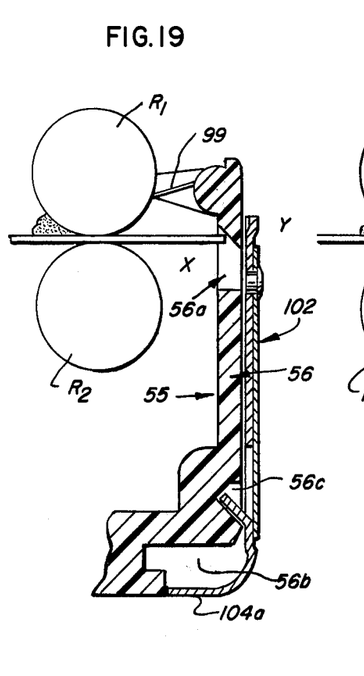
Figure 20:
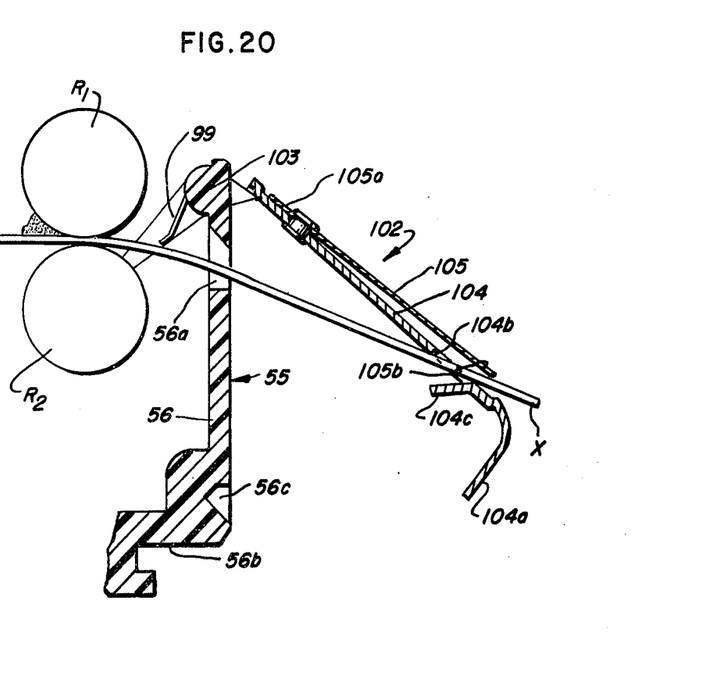

The film cartridge 51 is provided with a self-contained power pack unit which provides the necessary energy for initially actuating a cycle, or cycling, mechanism G (see FIG. 11), disposed within the housing, to make one complete cycle, whereupon the shield piece, initially accommodated within the cartridge container 52, will be automatically ejected through the end wall opening O, past feeder and spreader rolls $R_1$ and $R_2$, see FIGS. 19 and 20, and out through a slot 56a formed in the upper portion of a door piece 56, the latter forming a component of the door assembly 55. In addition to initially actuating the mechanism G, the power pack unit will subsequently provide the necessary power to successively discharge the exposed film sheets from the cartridge container and camera in a manner to be hereinafter described.

The rear end wall 57 of the cartridge container 52, see FIGS. 3 and 4, is provided with a notch 57a which is disposed adjacent one elongated side wall 58 of the container. A portion 52c of the top wall 52a of the container, aligned with the notch 57a, is cut away for a purpose to be described more fully hereinafter.

The camera housing H, as seen in FIGS. 1 and 2, has a substantially planar upper front wall 60 sometimes referred to as a Bezel board, which is above and recessed from the entry E to the interior cartridge compartment. Mounted on wall 60 is a main lens 61 encompassed by an exposed, manually adjustable, focusing ring 62 and a viewfinder opening 63 disposed to one side of lens 61. A manually adjustable light-dark control unit 64 is mounted on the top wall 65 of the housing adjacent the front wall 60. An opening 66 for the light-dark control unit 64 is provided in the front wall 60 and on the opposite side of the main lens 61 with respect to the viewfinder opening 63. Opening 66 permits light rays to pass therethrough onto a light-sensing device 67 (i.e., photo-electric cell) which is fixedly mounted on a panel 69 disposed behind the front wall 60, see FIG. 10. The light-sensing device 67 is operative only when a flash unit F is disassembled from the top surface 65 of the housing. Device 67 controls the shutter speed as a function of the ambient light surrounding the object being photographed.

Figure 24:
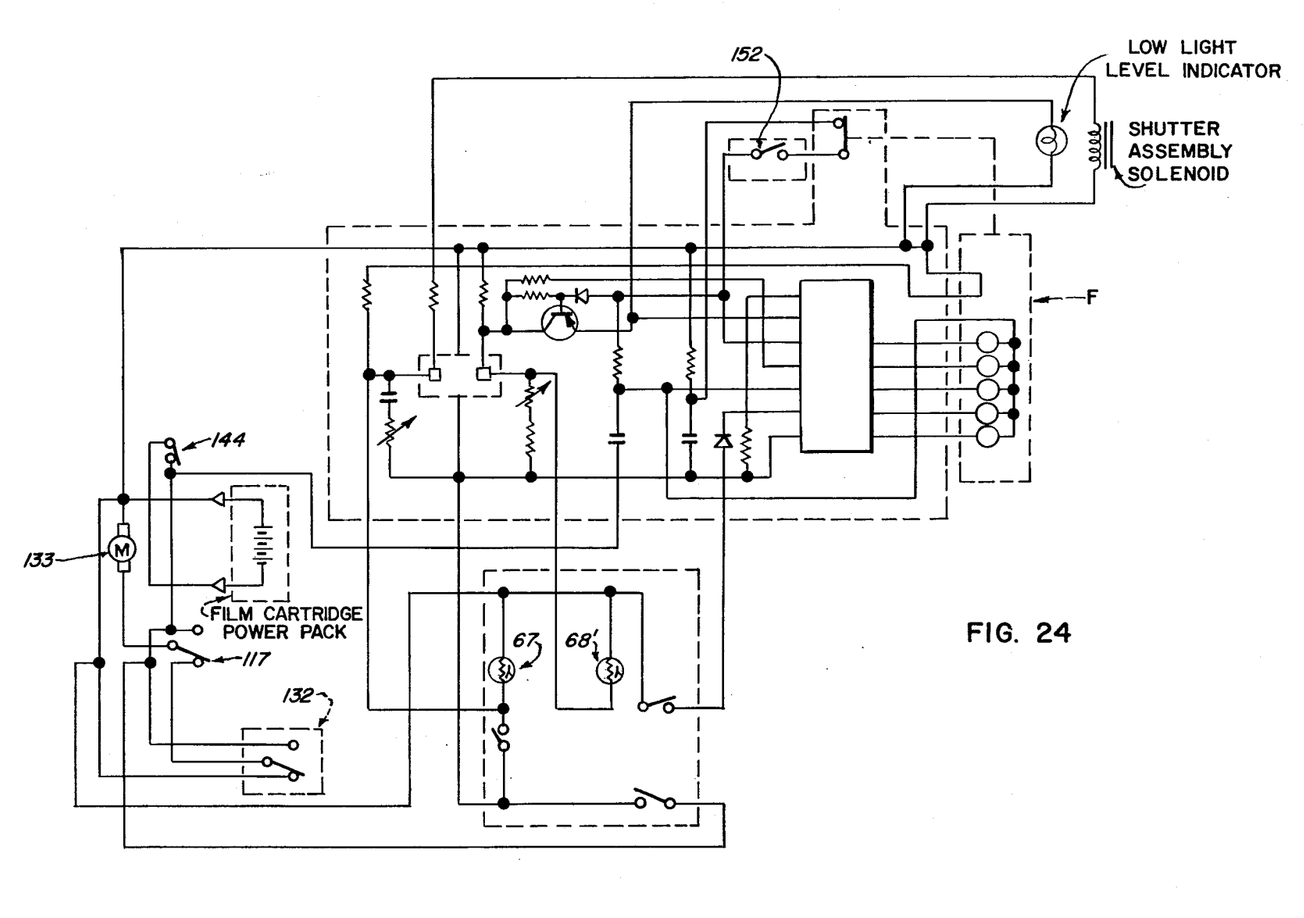
FIG. 24 is a circuit diagram for the cycle drive and flash unit.

An auxiliary opening 68 is also provided on the front wall beneath opening 66 and is adapted to permit light rays to pass therethrough onto a second photo-electric cell 68', see FIG. 10, which is also mounted on panel 69 and forms a component of a low-light level indicator used in conjunction with the viewfinder, see FIG. 24. The low-light level indicator automatically senses the intensity of the ambient light, and if the latter is insufficient to illuminate the subject being photographed, this fact will be made known through some visual signal appearing within the viewfinder. If the signal appears in the viewfinder, the operator will know that some flash unit should be used.

Removable mounted on the housing top wall 65 and disposed adjacent front wall 60 is flash unit F which, as shown in FIG. 1, may be of a type presently available on the market under the name, FLASH-BAR. The unit F is provided with a plurality of depending prongs, not shown, which are adapted to be disposed within a suitable socket 65a provided on the top wall 65, see FIG. 1. When the device F is in place, the prongs thereof extend into the socket and, by a linkage arrangement, permit the iris opening to be varied as the focusing ring 62 and the light-dark control unit 64 are manually adjusted. The linkage arrangement may be of the general type disclosed in pending application Ser. No. 296,591, filed Oct. 11, 1972.

Also, mounted on the upper surface 65 of the housing H and adjacent a side wall 70 of the housing is a shutter release button 71 which is adapted to be manually actuated when a subject is to be photographed either with or without the flash unit.

Figure 11:
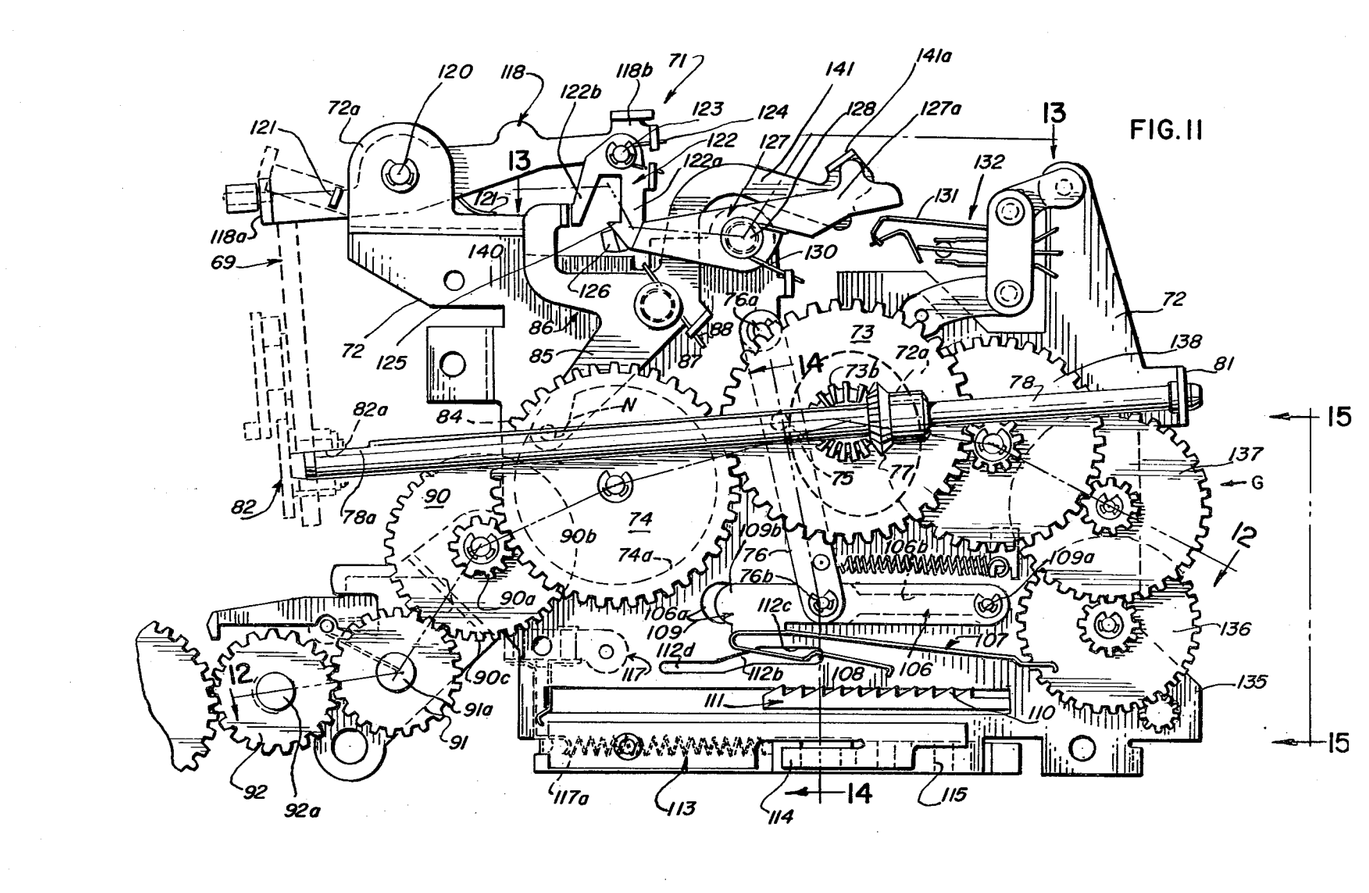
FIG. 11 is an enlarged fragmentary side elevational view taken from the interior side of the cycle mechanism which is disposed within the camera housing.
Figure 12:
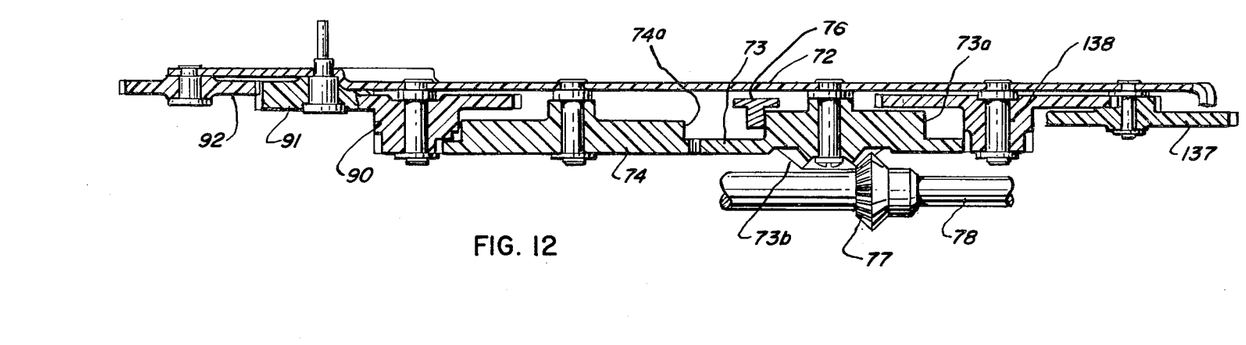
FIG. 12 is an enlarged fragmentary sectional view taken along line 12—12 of FIG. 11.
Figures 13, 14, 15:
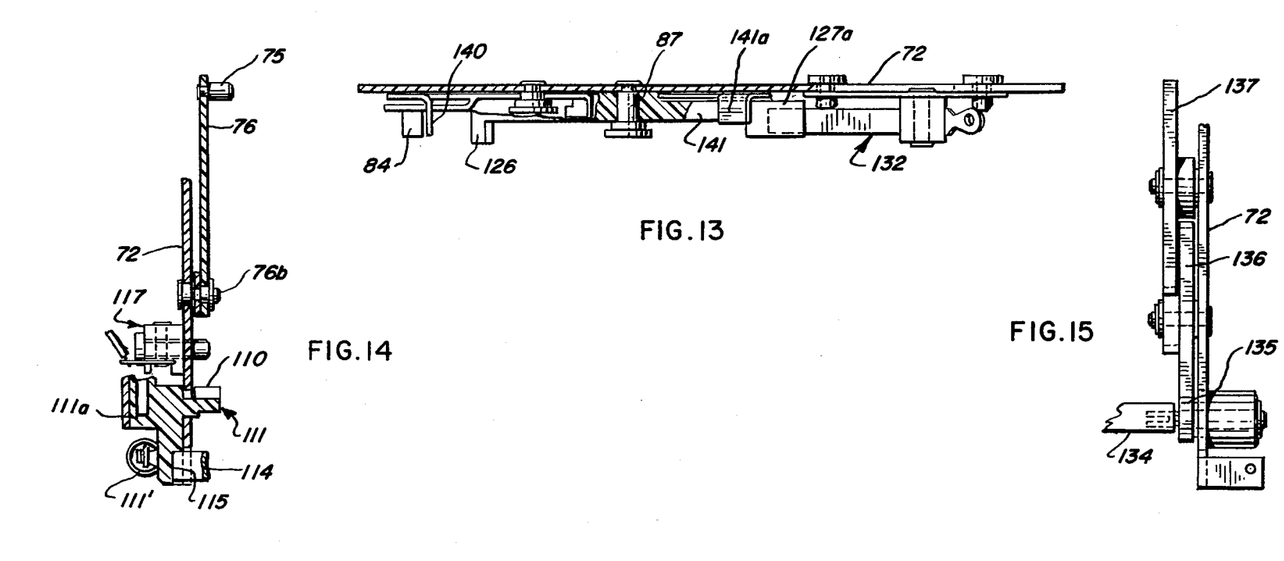
FIG. 13 is an enlarged fragmentary sectional view taken along line 13—13 of FIG. 11.
FIG. 14 is an enlarged fragmentary sectional view taken along line 14—14 of FIG. 11.
FIG. 15 is an enlarged fragmentary elevational view taken along line 15—15 of FIG. 11.
Figure 16:
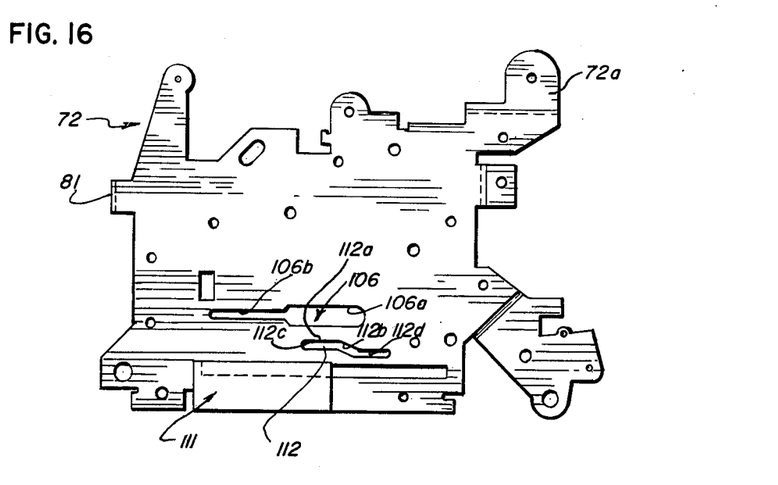
FIG. 16 is a side elevational view of the mounting bracket per se for the cycle mechanism shown in FIG. 11.
Figure 21:
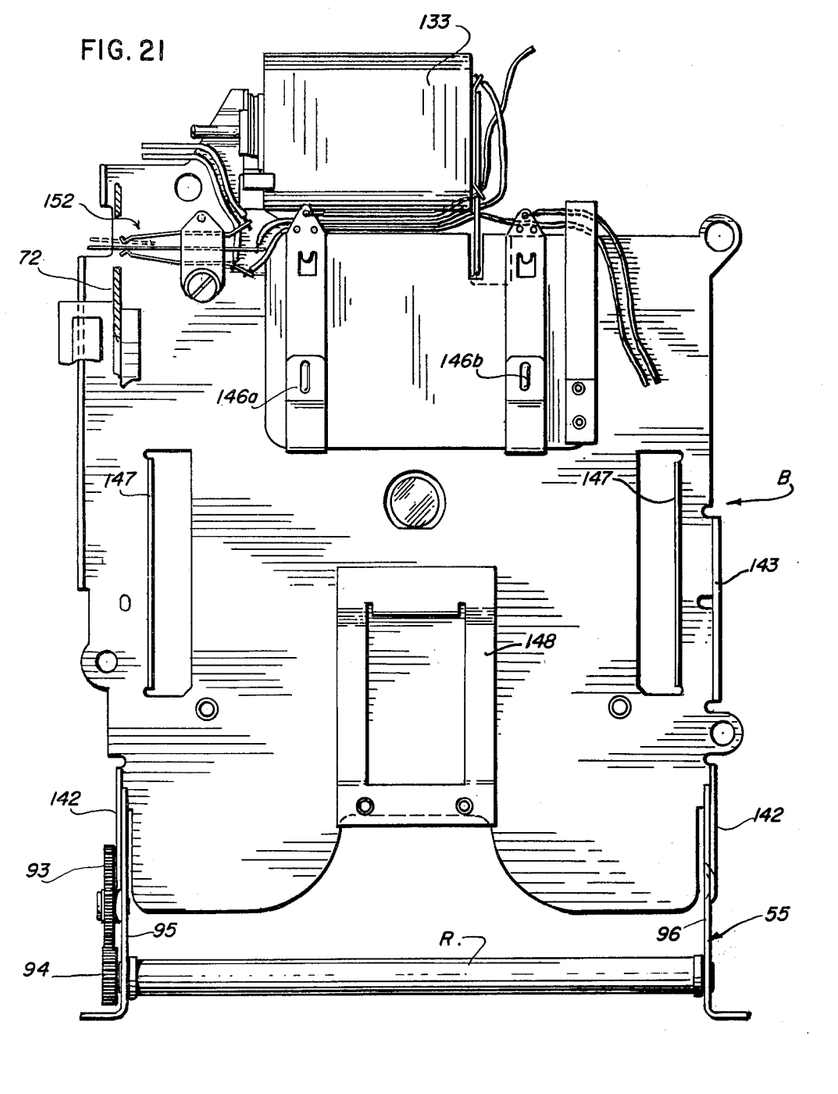
FIG. 21 is an enlarged top view of the base plate which forms the bottom of the compartment within the camera housing in which a film cartridge is accommodated.

As seen in FIG. 11, the cycling mechanism G includes an upright mounting bracket 72, see FIG. 16, which is disposed inwardly of but adjacent to the housing side wall 70 and is fixedly secured to a base plate B, see FIG. 21, the latter, in turn, being fixedly mounted on the bottom wall of the housing and forming the bottom surface of compartment C in which the film cartridge 51 is accommodated when the camera is loaded.

Mounted on the surface of bracket 72, which faces the interior of the housing, are a plurality of gears, one being a large diameter cycle gear 73, which is in meshing relation with a large diameter cycle switch gear 74. Gear 73 has formed on the surface thereof adjacent bracket 72 a cam 73a in continuous engagement with a pin 75 carried on an elongated follower arm 76 which, in turn, is mounted for pivotal movement about a fixed pin 76a.

Figure 9:
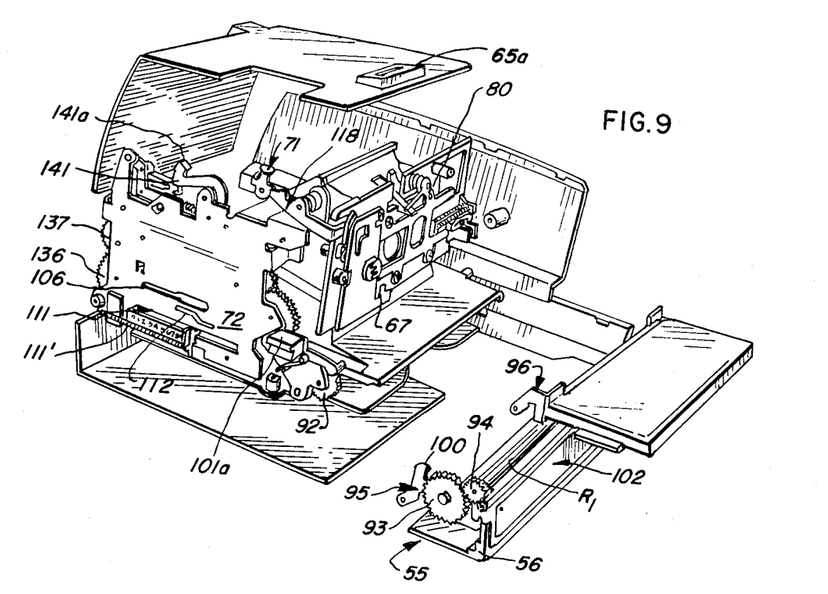
FIG. 9 is a fragmentary perspective top front view of the camera of FIG. 1 but showing the components therefor in exploded relation.

Projecting outwardly from the opposite surface of cycle gear 73 is a bevel pinion gear 73b which meshes with a complemental bevel gear 77 carried on an elongated shaft 78, the latter effecting recocking or rewinding of the shutter assembly 80 slidably mounted on panel 69, which, in turn, is disposed adjacent to but behind the front wall 60 of the housing H, see FIGS. 9 and 10. Shaft 78 is supported at its rear end by a suitable bearing 81 formed on mounting bracket 72. The opposite, or front, end 78a of the shaft 78 is slightly lower than the rear end and is facetted so as to extend into a suitable hub bore 82a which is journaled on the transverse panel 69, shown in phantom lines in FIG. 11. Panel 69 in addition to supporting the shutter assembly 80, also serves as a support on which front wall 60 of the housing is secured by suitable fasteners.

Formed on the surface of gear 74 adjacent bracket 72 is a cam 74a, see FIG. 11, which is provided with a notch N into which a pin 84 is adapted to fall when the gear 74 has made substantially one complete revolution. Pin 84 is carried on one leg 85 of an arm 86 which, in turn, is pivotally connected at 87 to bracket 72. Arm 86 is biased in a counter-clockwise direction by a spring 88. Arm 86 and its function will be described more fully hereinafter.

Cycle switch gear 74 is also in meshing relation with a small pinion-type gear 90a which forms a part of a first idler gear 90. Gear 90 is rotatably mounted about a fixed axis 90b formed on bracket 72. The outer periphery 90c of gear 90 meshes with a second idler spur gear 91 of reduced diameter which is rotatably mounted on a fixed axis 91a formed on bracket 72. Gear 91 also meshes with a third idler spur gear 92 rotatably mounted on a fixed axis 92a formed on bracket 72 and positioned adjacent one side of the entry E, see FIG. 7. When the door assembly 55 for the entry E is in a closed position, see FIGS. 1 and 2, gear 92 will be in meshing relation with a spur-type drive gear 93 which forms a component of the door assembly, see FIG. 18. Gear 93 meshes with a spur gear 94 of reduced diameter, which is disposed at one end of one of the feeder-spreader rollers $R_1$. The spacing between roller $R_1$ and roller $R_2$, the latter being disposed beneath roller $R_1$, is such that a single photographic sheet will pass therethrough and be frictionally engaged by the rollers. The roller $R_2$ is disposed in parallel relation with roller $R_1$ and is spring-biased towards roller $R_1$. The rollers coact to serve a dual function: a) they rupture the packet of developing liquid which is carried on the exposed light-sensitive surface of the sheet being removed from the container and then spread the developing liquid uniformly across the exposed surface of the sheet; and b) they cause the exposed photographic sheet to be fed through and ejected from the camera housing, whereupon full self-developing of the picture will occur within a predetermined period of time (i.e., 10 minutes).

Besides the feeder-spreader rollers $R_1$ and $R_2$ and door piece 56, the door assembly 55 includes a pair of side brackets 95 and 96 arranged in spaced substantially parallel relation and engaging opposite ends of the rollers. The brackets are fixedly secured to a portion of the door piece 56, which has a substantially L-shaped cross-sectional configuration, see FIG. 18. The length and size of piece 56 are such as to completely close off the entry E when the assembly is in its closed position, see FIG. 1.

Each bracket 95 and 96 is provided with an elongated slot 97 of like configuration which is adapted to accommodate an axial spindle 98 formed at each end of roller $R_2$. Thus, slots 97 permit relative space adjustment of roller $R_2$ with respect to roller $R_1$, so as to compensate for any variation in the thickness of the shield piece or photographic sheets passing between the rollers.

Bracket 95 has mounted thereon gear 93 which rotates about a fixed axis 93a and is adapted to mesh with the idler gear 92 of the cycling mechanism G when the door assembly is in its closed position. Bracket 95 is provided with a thumb-like protuberance 100 which is adapted to be automatically engaged and locked by a latch 101 carried on the housing and, thus, retain the door assembly in a closed position. The latch is provided with an exposed finger tab 101a which, upon being manually depressed, will cause the latch to disengage the protuberance 100, thereby permitting the door assembly to assume an open position.

As seen in FIGS. 19 and 20, the door assembly 55 includes a secondary cover unit 102 which is hingedly mounted on one face of the door piece 56 and when in its normal position is adapted to overlie and close off the slot 56a formed in piece 56. When unit 102 is in its normal position, as seen in FIG. 19, a light shield is provided for slot 56a. The unit 102 is adapted to be moved through a sector of approximately 30°-40°, see FIG. 20. The extent to which the unit can move to its fully open position, FIG. 20, is controlled by a rearwardly extending finger, not shown, formed at one end of the unit. The finger is disposed adjacent the pivotal axis 103 for the unit and is adapted to engage a stop, not shown, formed on the interior side of the piece 56.

Unit 102 comprises an elongated first plate-like member 104 which has the lower elongated edge 104a thereof offset inwardly. When the unit is in its normally closed position, see FIG. 19, the offset edge 104a is adapted to extend into a suitable recess 56b formed on the exposed surface of door piece 56 whereby the remainder of the member 104 will assume a substantially flush overlying relation with a corresponding exposed portion of the door piece 56. The offset edge 104a prevents light leakage when the door piece is in a closed position.

An elongated slot 104b is formed in member 104 in close proximity of the offset edge 104a, see FIGS. 19 and 20. The length of slot 104b approximates that of slot 56a formed in piece 56. The location of slot 104b on member 104 is such that, when unit 102 is in its normally closed position, FIG. 19, slot 104b will be remote from substantially parallel to slot 56a. The lower peripheral edge of slot 104b is angularly offset inwardly a slight amount forming a lip 104c which facilitates guiding of the leading edge X of the discharged photographic sheet or shield piece into the slot 104b.

A resilient sheet-like elongated lid 105 is carried on the exposed side of member 104 and is adapted to normally overlie the slot 104b in member 104. Only the elongated upper edge portion 105a of lid 105 is secured by rivets or the like to the member 104. Because of the resilient flexible character of the lid, the leading edge X of the photographic sheet will cause the lower portion 105b of the lid to flex outwardly a slight amount, see FIG. 20, thereby permitting the photographic sheet or shield piece to move through slot 104b.

Cover unit 102 is biased by a spring 106 in a clockwise direction so as to normally assume a closed position.

It will be noted in FIG. 19 that the leading edge X of the photographic sheet upon entering the slot 56a in the door piece 56 engages the bevelled upper edge Y of the slot 56a and is cammed thereby in a downward direction. As the leading edge X leaves slot 56a, it will engage the interior surface of member 104 and upn continuing its outward movement, will exert a force on member 104 sufficient to overcome the bias of spring 99 and cause unit 102 to pivot outwardly about axis 103 and assume the position shown in FIG. 20. Simultaneously with the pivotal movement of unit 102, the sheet leading edge X will slide along the interior surface of unit 102 until it engages lip 104c of slot 104b and be deflected thereby through slot 104b. Upon leaving slot 104b, the edge X engages the lower edge portion 105b of lid 105 and causes the latter to be deflected outwardly a slight amount, see FIG. 20. Because of the spring bias on unit 102, and the extent to which the unit 102 can be pivoted outwardly and the relative location of slot 104b with respect to slot 56a, the photographic sheet upon leaving rollers $R_1$ and $R_2$ will be flexed downwardly as shown in FIG. 20. It has been found that the flexed condition of the sheet produced a convex surface and effects better and more even spreading of the developing liquid across the exposed surface by the feeder and spreader rollers $R_1$ and $R_2$.

As previously mentioned, pin 75, which is carried on follower arm 76, is adapted to be in continuous engagement with the surface of the cam 73a formed on one side of the cycle gear 73. The upper end of the arm is mounted for pivotal movement about a fixed pin 76a carried on the mounting bracket 72. The lower end of the arm is pivotally connected at 76b to a slide piece 109, which is mounted for reciprocatory movement within an elongated slot 106 formed in bracket 72, see FIGS. 11 and 16. Slot 106, as seen in FIG. 16, has an enlarged portion 106a and a narrow portion 106b, the latter being disposed closest to the rear of the cartridge compartment C.

Slide piece 109 is provided with a lug 109a which is sized so as to slide within the narrow slot portion 106b while the slide piece reciprocates back and forth relative to the slot. The enlarged portion 106a permits the forward portion 109b and the connection 76b between arm 76 and slide piece 109 to move downwardly a slight amount as the slide piece is moved in a forward direction due to the pin 75 on the follower arm 76 responding to the surface configuration of cam 73a as the cycle gear 73 rotates in a clockwise direction, see FIG. 11, through a sector of approximately 140°.

Figures 22, 23:
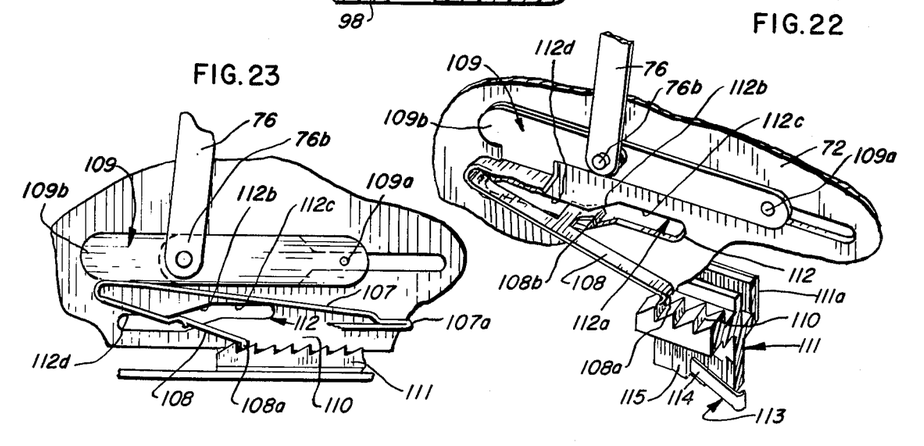
FIG. 22 is an enlarged fragmentary perspective view of the picker and counter mechanism disposed within the camera housing and actuated by the cycle mechanism.
FIG. 23 is a side elevational view of the mechanism shown in FIG. 22.

Carried on the forward end portion 109b of the slide piece and projecting laterally inwardly and rearwardly from the underside thereof are a pair of elongated resilient fingers 107 and 108, see FIGS. 22 and 23. Finger 107, sometimes referred to as a picker, is the longer of the two fingers and has the rear distal end 107a thereof bent downwardly a slight amount so as to form a hook. End 107a is adapted to be aligned with the notch 57a formed in the rear wall of the cartridge container 52. Thus, when the slide piece 109 is moved forwardly relative to the bracket slot 106, after the cartridge 51 has been inserted to its fullest extent into the housing compartment and the door assembly 55 has been moved to its closed position, the finger end 107a will contact the rear edge of either the shield piece or a photographic sheet, whichever the case may be, and cause the same to be discharged through the narrow opening O formed in the opposite end wall of the cartridge container. The extent to which the end 107a moves in a forward direction is such that the leading edge X of the shield piece or photographic sheet will be fed between the feeder-spreader roller $R_1$ and $R_2$. The cut-out 52c formed in the top surface of the cartridge container 52, see FIG. 3, prevents the movement of the end 107a being obstructed by the cartridge container. The distal end 107a of the finger 107 is offset an amount less than the thickness of the photographic sheet or the shield piece.

The shorter finger 108, sometimes referred to as a pawl, extends downwardly at a greater angle than picker finger 107, see FIG. 23, and has the distal end 108a thereof hook-shaped. The end 108a is adapted to engage a predetermined one of a plurality of serrations 110 formed on the upper surface of a counter block 111 upon each forward movement of the slide piece 109. The block 111 is mounted for intermittent incremental movement in a rectilinear path relative to the bracket 72 as the shield piece and photographic sheets are successively discharged from the cartridge container by the picker finger 107.

As seen in FIG. 22, pawl 108 is provided with a laterally extending follower tongue 108b which is adapted to be disposed within an elongated slot 112 formed within bracket 72 and disposed beneath slot 106. The longitudinal axes of slots 106 and 112 are disposed in spaced substantially parallel relation. Tongue 108b and the finger 108 are biased so that the tongue is in continuous engagement with an upper perimetric segment 112a of the slot 112. It will be noted in FIGS. 22 and 23 that at approximately mid-length of segment 112a there is a declining portion 112b which interconnects the raised right-hand portion 112c of the segment with a lower lefthand portion 112d. Thus, when the follower tongue 108b is engaging the right-hand portion 112c of the perimetric segment 112a, the hooked end 108a of the pawl 108 will be out of contact with the serrations 110 formed on the counter block 111. As the tongue 108b moves down the declining portion 112b, the hooked end 108a of the pawl will come into engagement with one of the serrations and will remain in engagement therewith for the remainder of the forward travel of the slide piece. Upon the slide piece 109 changing its direction of movement, namely rearwardly, the hooked end 108a will slide over the rearwardly disposed serrations until the tongue 108b begins to move up the portion 112b of the perimetric segment 112a of the slot 112 whereupon the hooked end 108b will become completely disengaged from the block serrations 110. Because of the resiliency of the pawl 108, the hooked end 108a will readily slide over the rearwardly disposed serrations. Thus, slot 112 causes bilevel movement of finger 108.

To prevent regression of block 111 while the end 108a is sliding rearwardly over the block serrations, a resilient retainer 113 is provided which is secured at its forward end to the bracket 72, see FIG. 11. The retainer 113 is biased so that the rear portion thereof extends into the housing compartment C. As seen in FIGS. 11 and 22, retainer 113 is provided with an inwardly and forwardly projecting resilient finger 114 which is adapted to engage a second set of serrations 115 formed on the side of the counter block 111. When the counter block 111 is being moved intermittently in a forward direction by pawl 108, finger 114 will slide over the serrations 115 and not obstruct forward movement thereof. As aforementioned, retainer 113 is normally biased so that it projects into the cartridge compartment C when no cartridge is disposed therein. When, however, the cartridge is loaded into the housing compartment C, the side wall of the cartridge will slidably engage the inwardly projecting portion of the retainer and deflect same outwardly, whereupon the finger 114 will engage the serrations 115 of the counter block 111.

The outwardly facing wall 111a of the counter block 111 is provided with a plurality of indicia (i.e., consecutive numerals) which are arranged in aligned longitudinally spaced relation. As the counterblock moves forwardly, consecutive numerals will successively appear within a small window 116 provided in the side of the camera housing, see FIGS. 1 and 2. In instances where the film cartridge 51 contains ten photographic sheets, the numbering provided on wall 111a will begin with "O" at the end of the block adjacent the rear of the compartment C and will conclude with "O" at the opposite end of the block. Thus, when the cartridge is intially inserted in the compartment, the block will be positioned in its rearmost position, whereupon the numeral "10" will appear in the window 116.

Figure 6:
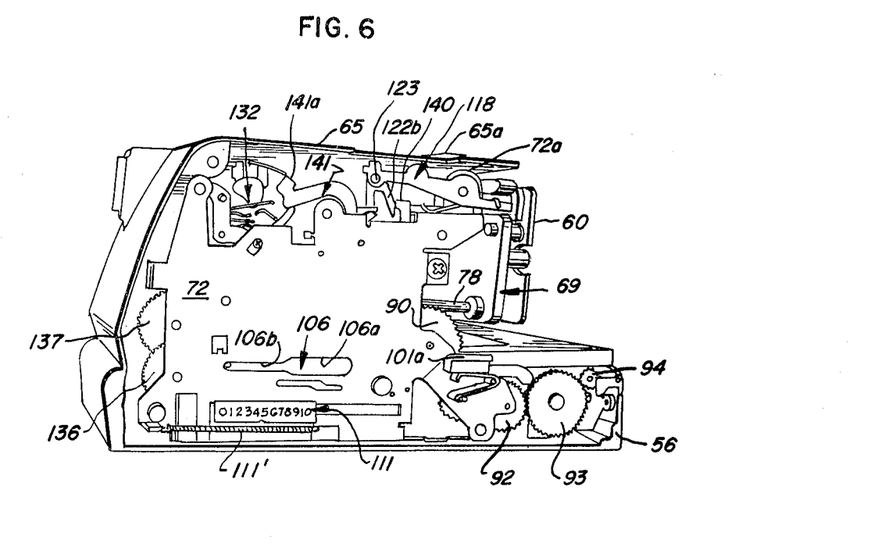
FIG. 6 is a fragmentary perspective side view of the camera of FIG. 1 but with a side portion of the housing therefor removed and the door assembly in a closed position.
Figure 7:
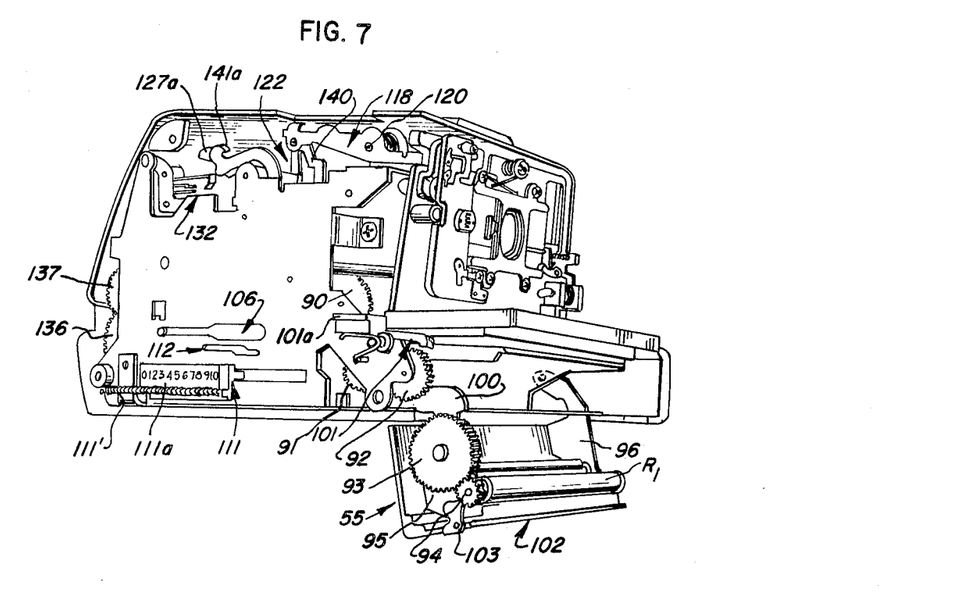
FIG. 7 is a fragmentary perspective view similar to FIG. 6 but showing the door assembly in an open position.

The counter block 111 is biased by spring 111', see FIGS. 6 and 7, to assume its rearmost position and thus, once the retainer finger 114 is disengaged from the serrations 115, the block will automatically assume its rearmost position. As aforementioned, the disengagement of the retainer finger 114 from serrations 115 occurs only when an empty cartridge is removed from the compartment.

When the counter block 111 has assumed its forwardmost position, that is, when the numberal "0" appears in the window 116, the forward end of the block 111 will engage an arm 117a of an interlock switch 117 and cause the latter to assume an open position. Switch 117 is fixedly secured to bracket 72 and forms a component of the flash or strobe light circuit, see FIG. 24. Thus, so long as switch 117 remains in an open position by counter block 111, the flash or strobe light used on the camera cannot be energized. With the block and switch arrangement, as aforedescribed, inadvertent energizing of the flash or strobe light is thus averted once the cartridge is void of photographic sheets.

As seen in FIG. 11, the shutter release button 71, which is disposed to one side of the housing, see FIG. 1, comprises an actuating arm 118 which is pivotally connected at 120 to an upwardly extending protuberance 72a, formed on bracket 72, see FIGS. 11 and 16. The forward end 118a of arm 118 projects through a suitable opening 69a formed in the upper left-hand corner of support panel 69, see FIG. 10. The arm 118 is biased in a counterclockwise direction by a spring 121, see FIG. 11.

The rear end 118b of arm 118 has pivotally connected thereto and depending therefrom an inverted substantially U-shaped latch 122. The central or bail portion of the latch is pivotally connected at 123 to arm end 118b. The latch 122 is biased in a clockwise direction about axis 123 by a spring 124, see FIG. 11. The right depending leg 122a of latch 122 is longer than the left depending leg 122b and is provided with a hook 125. Arm 118, as shown in FIG. 11, is disposed at an "at rest" position. Upon the end 118b of arm 118 being manually depressed, that is to say, the arm 118 is pivoted in a clockwise direction about axis 120, the hook 125 formed at the lower end of depending leg 122a engages a transverse lug 126 formed at one end of a rocker arm 127, the latter being mounted for pivotal movement about a fixed pin 128 projecting from bracket 72. Rocker arm 127 is biased in a counterclockwise direction by spring 130, see FIG. 11.

As actuating arm 118 is depressed, the hook 125 will be deflected slightly so as to slide past the lug 126 and upon release of the end 118b of the actuating arm 118, the hook 125 will automatically engage the underside of lug 126, whereupon because the spring force of spring 121 being greater than that of spring 130, the hook will move rocker arm 127 in a clockwise direction. It should be noted that clockwise movement of the rocker arm 127 occurs only upon release of the actuating arm 118. Thus, the beginning of the cycle to be hereinafter described is controlled by the operator releasing the shutter release button 71 which in turn releases arm 118. This is an important feature in that the operator can determine when the cycle should begin and, thus, prevent the exposed photographic sheet from being discharged from the camera housing into an undesirable environment (i.e., rain). For example, the operator can photograph the subject by depressing the button 71 and, while holding same in a depressed state, move the camera to a sheltered location.

Figure 8:
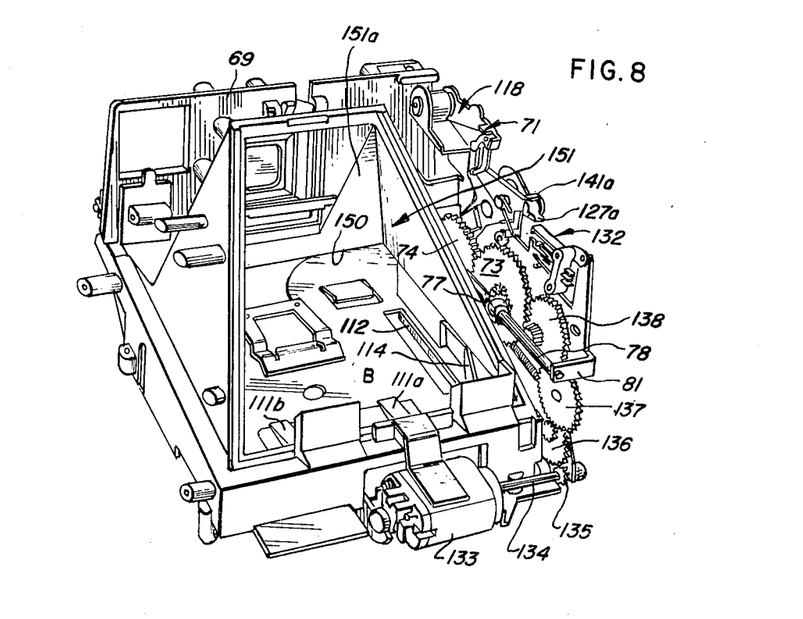
FIG. 8 is a fragmentary perspective top rear view of the camera of FIG. 1 but with the housing therefor removed.

Upon arm 127 being moved in a clockwise direction, the end 127a of the arm 127 opposite lug 126 will engage a trigger blade 131 comprising a part of a cycle switch 132 and cause the latter to move down as seen in FIG. 11, whereupon the circuit to a drive motor 133, see FIG. 8, mounted at the rear of base plate 106, is completed and the motor is actuated. The motor 133 will be actuated provided the cartridge 51 is inserted into the compartment C and the door assembly 55 is in its closed position, as will be explained more fully hereinafter. Once the motor 133 is actuated, the cycle gear 73 will make one complete revolution. What occurs during one revolution of gear 73 will be described more fully hereinafter. The power for the motor 133 is normally supplied by the power pack disposed within the film cartridge 51.

As seen in FIG. 8, the rotor of motor 133 forms a drive shaft 134 which has a small spur gear 135 keyed to the outer end thereof. The rotation of gear 135 is transmitted to cycle gear 73 through a second set of idler gears 136, 137, and 138.

Once the cycle gear 73 has made one complete revolution, the cycle switch 132 will automatically resume its normal position wherein the circuit between the power pack and the motor 133 is broken causing motor 133 to assume an idle condition. Movement of cycle switch 132 from its normal position is effected through the clockwise movement of arm 85 about the fixed axis 87, see FIG. 11. As arm 85 moves in a clockwise direction, a protuberance 140 formed on arm 86 will strike the leg 122b of latch 122 and cause the latter to pivot in a clockwise direction about axis 123 a sufficient amount so that hook 125 formed on the other leg 122a of the latch 122 will disengage the lug 126 on rocker arm 127, thereby enabling the bias of spring 130 to take effect and move rocker arm 127 in a counterclockwise direction until it assumes the position shown in FIG. 11, enabling the blade 131 of the cycle switch 132 to subsequently return to its normal position. However, before the arm 127 can resume its normal position, as seen in FIG. 11, certain sequential events must occur as will be described hereinafter.

As previously described, the movement of arm 85 is controlled by the cam 74a formed on a gear 74 which is in continuous contact with the follower pin 84 carried on the leg 85 of arm 86.

A second protuberance 141 is also formed on arm 86, see FIG. 11, which has the end 141a thereof offset so as to overlie the end 127a of rocker arm 127. When the rocker arm 127 is moved in a clockwise direction by the cam 74a of gear 74, the end 141a will retain end 127a in a down position notwithstanding that hook 125 has become disengaged from the lug 126 of arm 127. Protuberance 141 will keep the arm end 127a in the said down position until the gear 74 has made a complete revolution and the follower pin 84 has dropped into the notch N formed in the surface of cam 74a. When the pin 84 drops into notch N, the rocker arm 86 will automatically rotate in a counterclockwise direction about axis 87, thereby freeing arm 127 to move in a counterclockwise direction about axis 128.

Figure 17:
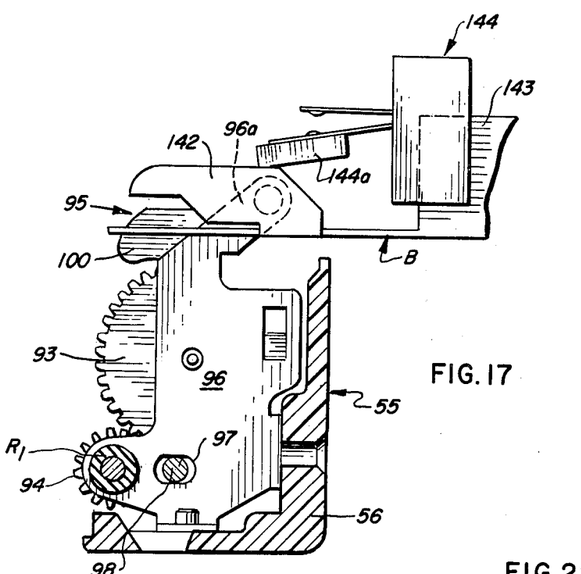
FIG. 17 is an enlarged vertical sectional view of the interlock switch and door assembly taken along line 17—17 of FIG. 10 and showing the door assembly in open position.

As aforementioned, in order that cycle gear 73 can make one complete cycle, it is necessary that the door assembly 55 be closed and the cartridge 51 be disposed within the compartment C. As seen in FIGS. 17 and 18, the door assembly 55 is hingedly connected to upright tabs 142 which are formed on opposite sides of the base plate B and adjacent the forward edge thereof, see FIG. 21. Mounted on an upturned flange 143 formed along one side of the base plate B is an interlock switch 144, see FIGS. 17 and 18, which assumes an open condition when the door assembly 55 is open, see FIG. 17, and assumes a closed condition when the door assembly is in a closed condition, see FIG. 18. The switch is actuated to a closed condition by a bevelled portion 96a of bracket 96 striking a lever 144a of the switch. Switch 144 is an interlock switch which forms a component within a circuit, see FIG. 24, including the power pack which is self-contained within the film cartridge 51. As seen in FIG. 4, the underside of the cartridge container 52 is provided with a pair of exposed electrical contacts 145a and 145b.

When the cartridge 51 is inserted to its fullest extent into the housing compartment C, the contacts 145a and 145b will engage resilient contacts 146a and 146b, respectively, which are carried on the base plate B adjacent the rear of the housing compartment, see FIG. 21. The contacts 146a and b are connected to motor 133 and, thus, initially the power from the self-contained power pack disposed within the film cartridge will cause the motor 133 to be actuated, whereupon the cycle gear 73 will make one complete revolution without the operator depressing the shutter release button 71 and thus cause the shield piece overlying the stack of photographic sheets to be ejected from the cartridge container. The aforedescribed operation pre-supposes that the door assembly 55 is in its closed position and the blade 131 of switch 132 is in the position shown in FIG. 11.

To facilitate proper positioning of the cartridge container within the housing compartment C, the base plate B, as seen in FIG. 21, is provided with a pair of struck-out guide flanges 147 arranged in spaced parallel relation. The flanges are adapted to slidably engage corresponding side walls of the cartridge container.

In addition to the flanges 147, the base plate B is provided with a spring piece 148 which is adapted to resiliently engage the underside of the cartridge container 52 and thus hold the apertured top surface 52a of the container snugly against a continuous shoulder 150, which delimits the bottom of an image reflector cavity 151, the latter being disposed within the camera housing, see FIG. 8. The front wall 151a of cavity 151 communicates directly with the lens opening. An angularly disposed mirror, not shown, overlies the upper portion of the cavity 151 and reflects the image passing through the lens opening into the sensitized area of the uppermost photographic sheet disposed within the container when the latter is accommodated in the housing compartment C.

As seen in FIG. 21, an interlock switch 152 is mounted on the base plate B adjacent the rear edge thereof. The switch 152 forms a component for the circuit for the motor 133 and is actuated by the cartridge container when the latter is properly positioned within the housing compartment C. Thus, in order to cause the motor 133 to become energized, it is essential that the container be accommodated within the compartment so as to actuate switch 152 and the door assembly 55 closed so as to close switch 144.

Thus, it will be seen that a camera construction has been provided which overcomes the shortcomings besetting prior cameras of this general type and at the same time enables a person with very limited experience to take photographs of high quality.

We claim:

1. A camera construction comprising a housing with a compartment therein provided with an entry for removably accommodating a cartridge containing a plurality of photographic sheets arranged in superposed relation and with a corresponding surface of each sheet being light sensitive; drive means within the housing for selectively removing a sheet from the cartridge subsequent to the light sensitive surface thereof being exposed; and a door assembly mounted on the housing for movement between open and closed positions with respect to the compartment entry; said drive means having a picker unit mounted within said compartment for reciprocatory movement towards and away from the compartment entry to effect removal of an exposed photographic sheet from an accommodated cartridge, and power means for controlled actuation of said picker unit; said power means being capable of operation when a cartridge is accommodated in the housing, the door assembly is in a closed position and the photographic sheet has been exposed; said picker unit including an elongated member movable in substantially endwise directions and having an outwardly extending first protuberance disposed within an elongated stationary first guide means positioned within the housing adjacent one side of the compartment, an inwardly extending second protuberance spaced from said first protuberance and projecting into the compartment, said second protuberance having a rearwardly extending resilient finger with a depending tongue formed on the rear end thereof for engaging the rear edge of a photographic sheet disposed within an accommodated cartridge and effect edgewise movement of the sheet out of the cartridge towards the door assembly when said picker unit is actuated by said power means in one direction towards the compartment entry.

2. The camera construction of claim 1 wherein the second protuberance of the elongated member of said picker unit includes a resilient rearwardly extending second finger, said second finger having an outwardly extending tab slidably disposed within an elongated stationary second guide means positioned within the housing adjacent said one side of the compartment, said second guide means being disposed adjacent to but spaced beneath said first guide means, said second guide means effecting bi-level movement of said second finger independently of said first finger upon endwise movement of the picker unit elongated member.

3. The camera construction of claim 2 including a counter piece mounted within said housing for intermittent movement, said piece being intermittently engaged by the resilient second finger of the picker unit and actuated thereby only when the tab of said second finger is moving in said one direction through a predetermined segment of the second guide means.

4. The camera construction of claim 3 wherein the counter piece is mounted for incremental movement in one direction from a starting position by the second finger of picker unit only when the cartridge is accommodated within said compartment.

5. The camera construction of claim 4 including a resilient pawl mounted within the compartment for movement between an operative position and an inoperative position, said pawl being automatically moved into an operative position when the film cartridge is accommodated in the compartment whereby said pawl resiliently engages a ratchet section formed on the counter piece and permits movement of said counter piece in only said one direction.

6. The camera construction of claim 5 wherein the pawl automatically assumes a disengaged position with respect to the ratchet section of said counter piece when the film cartridge is removed from the compartment, whereby said counter piece automatically returns to the starting position.

7. The camera construction of claim 6 wherein the counter piece moves intermittently in a substantially rectilinear path from the starting position to a terminal position, said counter piece reaching said terminal position only when the last photographic sheet has been removed from the accommodated cartridge by the picker unit; said counter piece automatically returning uninterruptedly from said terminal position to said starting position only when the film cartridge is manually withdrawn from the compartment.

8. The camera construction of claim 7 wherein the path of movement of the counter piece is controlled by an elongated stationary guide means disposed within the compartment; the guide means for said counter piece and the picker unit being formed on a stationary bracket disposed in an upright position and defining a side wall of the compartment.

9. The camera construction of claim 8 wherein the bracket has rotatably mounted thereon a cycle gear, a cycle switch gear in meshing relation therewith, a drive gear, and a first set of meshing idler gears interconnecting said drive gear and said cycle gear; a follower element adjustably mounted on the bracket and connected to the picker unit, said follower element engaging a cam surface formed on said cycle gear and being actuated by said cam surface whereby one revolution of said cycle gear effects reciprocatory substantially rectilinear movement of said picker unit effecting discharge of a photographic sheet from an accommodated cartridge and a predetermined incremental movement of the counter piece away from its starting position.

10. The camera construction of claim 9 wherein the drive gear is actuated by a battery-powered drive motor disposed within the housing and remote from the entry to the compartment.

11. The camera construction of claim 10 wherein the bracket has pivotally mounted thereon a first arm biased to assume a predetermined static position, a second arm spaced from said first arm and biased to assume a predetermined static position, and a third arm spaced from said first and second arms and biased to assume a predetermined static position, and a cycle switch mounted on said bracket adjacent said third arm and in series connection with the drive motor, said switch normally assuming an open position; manual pivoting of said first arm in one direction from said static position effecting exposure of a photographic sheet within the accommodated cartridge, and release of said first arm effecting automatic return of said first arm to said static position, said first arm upon automatic return to said static position releasably engaging said third arm and effecting pivoting of the latter in one direction and closing said cycle switch whereby said cycle gear is driven through one revolution; said cycle switch gear being provided with a cam surface in continuous engagement with a first portion of said second arm, said second arm having a second portion engaging said first arm and effecting disengagement between said first and third arms only when said cycle switch gear has made substantially one complete revolution whereby said third arm automatically returns to said static position and said cycle switch assumes said normal open position.

12. The camera construction of claim 10 wherein said cycle gear is in meshing engagement with a shutter-rewind mechanism, said mechanism being operatively connected to shutter means mounted on said housing for controlled movement between a cocked position wherein the photographic sheets within the accommodated cartridge are light-shielded and an uncocked position wherein one of the photographic sheets of said accommodated cartridge is exposed for a predetermined time interval; said shutter means being released from said cocked position only upon said first arm being manually pivoted in one direction from its static position; said shutter-rewind mechanism, when actuated by said cycle gear, effecting movement of said shutter means from said uncocked position of said cocked position.

13. The camera construction of claim 11 including a first interlock switch in series connection with said cycle switch, said interlock switch being actuated to a closed position only when the door assembly is disposed in a closed position with respect to the compartment entry.

14. The camera construction of claim 13 including a second interlock switch in series connection with said first interlock switch and said cycle switch, said second interlock switch being disposed within the compartment and in remote relation with the compartment entry, said second interlock switch being actuated to a closed position only upon the cartridge being fully accommodated within said compartment.

15. The camera construction of claim 11 wherein the first arm includes a lever mounted on and movable with said first arm and being movable independently thereof to effect engagement and disengagement with the third arm; said lever being biased in a predetermined direction to automatically effect latched engagement with said third arm when said first arm is manually actuated a predetermined amount in one direction; the second arm contacting and overcoming the bias on said lever to effect disengagement of said lever from said third arm only when the cycle switch gear has moved through a predetermined sector of rotational adjustment.

16. The camera construction of claim 4 wherein the counter piece upon reaching a terminal position furthest removed from the starting position engages a fixedly mounted interlock switch and causes same to move from a normally closed position to an open position; said interlock switch being in series connection with a flash unit mounted on the exterior of the camera housing whereby the latter is rendered inoperative while said interlock switch is disposed in said open position.

17. The camera construction of claim 16 wherein the flash unit is removably mounted on said housing exterior.

18. A camera construction comprising a housing with a compartment therein provided with an entry for removably accommodating a cartridge containing a plurality of photographic sheets arranged in superposed relation and with a corresponding surface of each sheet being light sensitive; a shutter-release device mounted on said housing for adjustment between operative and inoperative positions; drive means within the housing for selectively removing a sheet from the cartridge subsequent to the light sensitive surface thereof being exposed; and a door assembly mounted on the housing for movement between open and closed positions with respect to the compartment entry; said drive means including a picker unit mounted within said compartment for reciprocatory movement towards and away from the compartment entry to effect removal of an exposed photographic sheet from an accommodated cartridge, and power means for controlled actuation of said picker unit; said power means actuating said picker unit towards said compartment entry only when a cartridge is accommodated in when the housing, the door assembly is in a closed position, when the photographic sheet has been exposed, and when the shutter-release device moves from an operative position to an inoperative position.

* * * * *

UNITED STATES PATENT AND TRADEMARK OFFICE
CERTIFICATE OF CORRECTION

PATENT NO. : 4,069,490
DATED : JANUARY 17, 1978
INVENTOR(S) : THOMAS G. GRAHAM ET AL.

It is certified that error appears in the above-identified patent and that said Letters Patent are hereby corrected as shown below:

```
Column  4, line 31        - "onto" should be --into--
Column  5, line 59        - "Removable" should be --Removably--
Column  6, line 48        - After "turn" delete second comma (,)
Column  8, line  2        - "of" should be --to--
Column  8, line  7        - Insert --and-- before "substantially"
Column  8, line 29        - "upn" should be --upon--
Column 10, line 39        - "0" should be --10--
Column 12, line 20        - Delete "a" before "gear"
Column 13, line 25        - "into" should be --onto--
Column 15, Claim 12, line  1 - "10" should be --11--
Column 15, Claim 12, line 60 - "of" should be --to--
Column 16, Claim 18, line 58 - After "in" delete "when"
Column 16, Claim 18, line 58 - Insert --when-- before "the"
                               (second occurrence)
```

Signed and Sealed this

Ninth Day of May 1978

[SEAL]

Attest:

RUTH C. MASON
Attesting Officer

LUTRELLE F. PARKER
Acting Commissioner of Patents and Trademarks